US010404170B2

(12) United States Patent
Uenaka et al.

(10) Patent No.: US 10,404,170 B2
(45) Date of Patent: Sep. 3, 2019

(54) CIRCUIT OF A POWER SUPPLY UNIT HAVING A SWITCHING DEVICE

(71) Applicant: Mitsubishi Electric Corporation, Chiyoda-ku (JP)

(72) Inventors: Mai Uenaka, Chiyoda-ku (JP); Yuuya Tanaka, Chiyoda-ku (JP); Masaki Yamada, Chiyoda-ku (JP); Yoshihiro Takeshima, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 69 days.

(21) Appl. No.: 15/129,212

(22) PCT Filed: Apr. 2, 2015

(86) PCT No.: PCT/JP2015/060470

§ 371 (c)(1),
(2) Date: Sep. 26, 2016

(87) PCT Pub. No.: WO2015/178106

PCT Pub. Date: Nov. 26, 2015

(65) Prior Publication Data

US 2018/0183318 A1 Jun. 28, 2018

(30) Foreign Application Priority Data

May 21, 2014 (JP) ................................ 2014-104867

(51) Int. Cl.
*H02M 3/158* (2006.01)
*H02M 3/155* (2006.01)
(Continued)

(52) U.S. Cl.
CPC .......... *H02M 3/158* (2013.01); *H02M 3/155* (2013.01); *H02M 3/156* (2013.01);
(Continued)

(58) Field of Classification Search
CPC ......... H02M 2001/0058; H02M 1/083; H02M 3/156; H02M 3/158; H02M 3/1588; Y02B 70/1425; Y02B 70/1466
See application file for complete search history.

(56) References Cited

U.S. PATENT DOCUMENTS 5,262,930 A * 11/1993 Hua ..................... H02M 3/158 323/222
5,486,752 A * 1/1996 Hua ..................... H02M 3/158 323/222

(Continued)

FOREIGN PATENT DOCUMENTS

JP 8-308219 A 11/1996
JP 10-146048 A 5/1998

(Continued)

OTHER PUBLICATIONS

English translation of "Engineering design method of passive lossless snubber" by Du, Yu et al., originally cited by Apoplicant on the Infrormnation Disclosure Statement filed on May 2, 2018. Translated by LinguaLinx Language Solutions, Inc., Troy, NY.*

(Continued)

*Primary Examiner* — Fred E Finch, III
(74) *Attorney, Agent, or Firm* — Oblon, McClelland, Maier & Neustadt, L.L.P.

(57) ABSTRACT

A power supply unit includes: a first rectifying device connected to the direct current power source, a second rectifying device having an anode connected to the first rectifying device, a first condenser having one end connected to the second rectifying device, a second condenser connected to the second rectifying device, a third rectifying device having an anode connected to the second rectifying device, a resonance reactor connected to the third rectifying device and connected to the first condenser, s switching device connected to the direct current power source and (Continued)

connected the third rectifying device, an output reactor connected to the third rectifying device, an output condenser connected to the direct current power source and connected to the output reactor, an output rectifying device connected to the first condenser and connected to the direct current power source, a control circuit sending a gate signal to the switching device.

11 Claims, 7 Drawing Sheets

(51) Int. Cl.
*H02M 3/156* (2006.01)
*H02M 1/00* (2006.01)

(52) U.S. Cl.
CPC .. *H02M 2001/0058* (2013.01); *Y02B 70/1425* (2013.01); *Y02B 70/1466* (2013.01); *Y02B 70/1491* (2013.01)

(56) References Cited

U.S. PATENT DOCUMENTS

| | | | | |
|---|---|---|---|---|
| 5,841,268 A * | 11/1998 | Mednik | H02M 1/34 | 323/222 |
| 5,946,208 A * | 8/1999 | Yamamoto | A61B 6/488 | 363/132 |
| 6,341,076 B1 * | 1/2002 | Kadatskyy | H02M 1/34 | 363/56.09 |
| 2004/0264214 A1 * | 12/2004 | Xu | H02M 3/158 | 363/16 |
| 2007/0007933 A1 * | 1/2007 | Chan | H02M 1/44 | 323/235 |
| 2007/0194769 A1 * | 8/2007 | Yamashita | H02M 3/158 | 323/282 |
| 2007/0230228 A1 * | 10/2007 | Mao | H02M 3/156 | 363/89 |
| 2015/0115911 A1 * | 4/2015 | Parto | H02M 3/158 | 323/271 |
| 2015/0318784 A1 * | 11/2015 | Wu | H02M 3/158 | 323/283 |

FOREIGN PATENT DOCUMENTS

| | | |
|---|---|---|
| JP | 3055121 B2 | 6/2000 |
| JP | 2001-309647 A | 11/2001 |

OTHER PUBLICATIONS

International Search Report dated Jun. 23, 2015 in PCT/JP2015/060470 filed Apr. 2, 2015.

Combined Office Action and Search Report dated Feb. 11, 2018 in Chinese Patent Application No. 201580015509.6 with unedited computer generated English translation of the Office Action and English translation of categories of cited documents, 13 pages.

Du Yu, et al. "Engineering Design Method of Passive Lossless Snubber", Power Electronics, vol. 39, No. 1, Feb. 2005, pp. 66-69 (with English Abstract).

Sun Hui-Xian, et al, "Parameter design and experiment of the improved ZVT-PWM Buck converter", Electric Power Automation Equipment, vol. 25, No. 8, Aug. 2005, pp. 66-69 (with English Abstract).

Office Action dated Aug. 16, 2018 in Chinese Patent Application No. 201580015509.6, with English translation, 7 pages.

Sha Zhanyou et al., Optimal Design of Switching Power Supply(Kai Guandianyuan) China Electric Power Press, Jan. 31, 2013 pp. 14-15.

* cited by examiner

CIRCUIT OF A POWER SUPPLY UNIT HAVING A SWITCHING DEVICE

FIELD OF THE INVENTION

The present invention relates to a circuit of a power supply unit, and more particularly to the circuit of the power supply unit which has reduced switching losses.

BACKGROUND

In the electrical power supply circuit of an electronic device and the like, a DC to DC converter of chopper type is widely used, which supplies to a load the direct current power output with a voltage different from that of a direct current power source (see Patent Documents 1 to 4, for example). The DC to DC converter of chopper type, at first, chops the direct current power from a direct current power source, by the direct switching operations of switching elements and converts it to high frequency electric power. The high frequency electric power is smoothed with a reactor and an output condenser, and is further converted into the direct current power again. More specifically, a DC to DC converter of step down chopper type is proposed, which includes a direct current power source, a transistor, an output diode, a reactor, an output condenser and a control circuit (see Patent Document 1, for example).

In the DC to DC converter of step down chopper type, the transistor works as a switching device, the collector terminal (one main terminal) of which is connected to the positive terminal (one end) of the direct current power source. The output diode works as an output rectifying device of feed-back use, which is connected to the emitter terminal (the other main terminal) of the transistor and the negative terminal (the other end) of the direct current power source. The reactor has an end connected to the connection point of the transistor and the output diode. The output condenser is connected to the other end of the reactor and also to the negative terminal of the direct current power source. A load is connected with the output condenser, in parallel to each other. The control circuit sends a control pulse signal to the base terminal of the transistor and achieves the on and off control of the transistor.

The DC to DC converter of step down chopper type is capable of supplying to a load the direct current power output with a voltage lower than that of a direct current power source, by controlling the on and off action of a transistor. When the transistor turned on or turned off, switching loss, based on the overlapping portion between a collector to emitter voltage waveform (VCE) of the transistor and a collector current waveform (IC) of the transistor, is generated in a large quantity. The collector to emitter voltage waveform (VCE) of the transistor and the collector current waveform (IC) of the transistor are steep at a leading edge of the waveform. Accordingly, surges in voltage (Vsr), surges in current (Isr) and noises are produced in a spike like manner.

In order to reduce the before-mentioned surges and noises, a DC to DC converter of chopper type has been proposed, which includes a direct current power source, a switching device, an output rectifying device, a reactor, an output condenser, a resonance reactor, a first rectifying device, a first resonance condenser, a second rectifying device, a second resonance condenser, a third rectifying device (see Patent Document 1, for example). A load is connected with the output condenser, in parallel to each other. The direct current power source is composed of a rectifying circuit which converts the alternative current voltage of an alternative current power source into the direct current voltage. The switching device has one main terminal which is connected to one end of the direct current power source. The output rectifying device is connected to the other main terminal of the switching device and also to the other end of the direct current power source. The reactor has one end which is connected to the connection point of the switching device and the output rectifying device.

The output condenser is connected to the other end of the reactor and also to the other end of the direct current power source. The resonance reactor is connected to the switching device and also to the connection point of the output rectifying device and the reactor. The first rectifying device has one end which is connected to the connection point of the switching device and the resonance reactor. The first resonance condenser has one end which is connected to the connection point of the resonance reactor and the output rectifying device. The second rectifying device is connected to the other end of the first resonance condenser and also to the other end of the direct current power source. The second resonance condenser is connected to the other end of the first rectifying device and also to one end of the direct current power source. The third rectifying device is connected to the other end of the first rectifying device and also to the other end of the first resonance condenser.

The DC to DC converter of chopper type supplies the direct current power output with a voltage lower than that of a direct current power source to the load, by turning the switching device on and off. When the switching device is on an off-state, the first resonance condenser is discharged. At the same time, the second resonance condenser is charged in a sine wave manner. Moreover, when the switching device is turned on, the second resonance condenser is discharged. Thereby, the first resonance condenser and the second resonance condenser and the resonance reactor are made into resonance state and the resonance current flows into the switching device. When the switching device is turned off, the first rectifying device is turned into a forward bias state. The electric current which flows through the switching device is switched promptly into an electric current which flows through the second resonance condenser.

The first resonance condenser is discharged, and in addition, the second resonance condenser is charged in a sine wave manner. Accordingly, the voltage between both ends of the switching device starts to rise in a sine wave manner from 0 V, and thereby, a zero voltage switching is achieved when the switching device is on a turn-off state. The switching device produces a reduced switching loss, at the time of turn off. When the switching device becomes the on-state from the off-state, the second resonance condenser is discharged. The first resonance condenser and the second resonance condenser and the resonance reactor enter into the resonant state, and the resonant current flows through the switching device.

The electric current which flows through the switching device increases linearly from zero. Accordingly, the zero current switching is achieved at the time when the switching device is on a turn-on state. Thereby, the switching loss at the time of turn-on of the switching device can be reduced. By the resonance actions among the first resonance condenser, the second resonance condenser and the resonance reactor, the switching loss at the time of on and off actions of the switching device is lowered, and in addition, the spike like surged voltage and surged current are also lowered, Moreover, the electric current which flows through the output rectifying device gradually decreases, by the selfinduction mechanism of the resonance reactor at the time when the switching device is on a turn-on state. The recovery current, which flows through the output rectifying device in a reverse direction, decreases at the time when the switching device is on a turn-on state. In consequence, a current limiting reactor can be eliminated from the power supply circuit and the number of components can be reduced. In addition, the switching loss and noises due to the recovery characteristic features of the output rectifying device can be further reduced at the time when the switching device is on a turn-on state.

CITATION LIST

Patent Literature

Patent Document 1: JP 3055121 B2
Patent Document 2: JPH08-308219 A
Patent Document 3: JPH10-146048 A
Patent Document 4: JP2001-309647 A

SUMMARY OF THE INVENTION

Technical Problem

As explained above, an electric current which flows into the resonance reactor from the direct current power source and an electric current which flows from the resonance condenser pass through at the same time in the DC to DC converter of chopper type, when the switching condensers are turned on. The resonance reactor has a larger peak current. Accordingly, a large size reactor is employed as the resonance reactor, which does not saturate even when a high electric current flows into it. The present invention has been implemented to propose a circuit which can employ a compact reactor as a resonance reactor, by making the electric current which the resonance reactor carries smaller in peak current.

Solution to Problem

The power supply unit in accordance with the present invention includes a direct current power source having a positive terminal and a negative terminal, a first rectifying device having an anode which is connected to the negative terminal of the direct current power source, a second rectifying device having an anode which is connected to a cathode of the first rectifying device, a first resonance condenser having one end which is connected to the anode of the second rectifying device, a second resonance condenser connected to a cathode of the second rectifying device and connected to the positive terminal of the direct current power source, a third rectifying device having an anode which is connected to the cathode of the second rectifying device, a resonance reactor connected to a cathode of the third rectifying device and connected to the other end of the first resonance condenser, s switching device having a first main terminal which is connected to the positive terminal of the direct current power source and having a second main terminal which is connected the cathode of the third rectifying device, an output reactor having one end which is connected to the cathode of the third rectifying device, an output condenser connected to the negative terminal of the direct current power source and connected to the other end of the output reactor, an output rectifying device having a cathode which is connected to the other end of the first resonance condenser and having an anode which is connected to the negative terminal of the direct current power source, a control circuit sending a gate signal to a control terminal of the switching device.

Advantageous Effects of Invention

In the power supply unit in accordance with the present embodiments, a resonance reactor is made smaller in peak current, so a compact reactor is allowed to be employed as the resonance reactor.

DESCRIPTION OF EMBODIMENTS

An embodiment of the power supply unit in accordance with the present invention is described below in detail with reference to the drawings. Note that, the present invention is not limited to the description given below and may be appropriately modified within a scope that does not deviate from its spirits.

Embodiment 1.

Figure 1:
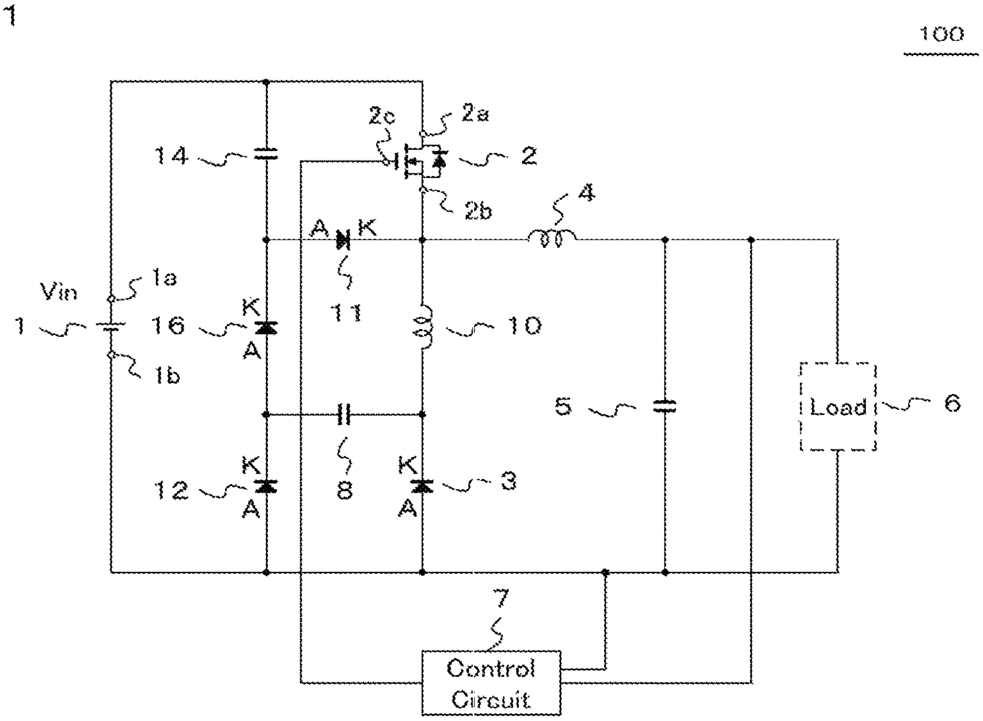
FIG. 1 is a circuit diagram for showing the power supply unit in accordance with Embodiment 1 of the present invention.

The circuit diagram of the power supply unit in accordance with Embodiment 1 of the present invention is shown in FIG. 1. The power supply unit 100 in accordance with Embodiment 1 includes a direct current power source 1, a switching device 2, an output reactor 4, an output condenser 5, a control circuit 7, a resonance reactor 10, a first resonance condenser 8, a second resonance condenser 14, a first rectifying device 12, a second rectifying device 16, a third rectifying device 11 and an output rectifying device 3. The direct current power source 11 is composed of a rectifying circuit for transforming the alternative current voltage of an alternative current power source into the direct current voltage (Vin), and has a positive terminal 1*a* and a negative terminal 1*b*. The switching device 2 includes a first main terminal 2*a*, a second main terminal 2*b* and a control terminal 2*c*. The first rectifying device 12, the second rectifying device 16, the third rectifying device 11 and the output rectifying device 3, each and all, has an anode (A) and a cathode (K). The output reactor 4 is arranged in the positive side of a load 6. However, similar effects are produced in the power supply unit, even if the output reactor 4 is arranged in the negative side of the load 6.

The switching device 2 has one main terminal (first main terminal 2*a*) which is connected to one end (positive terminal 1*a*) of the direct current power source 1. In addition, the switching device 2 has the other main terminal (second main terminal 2*b*) which is connected to the cathode of the third rectifying device 11. As for the output rectifying device 3, its cathode is connected to the connection point of the resonance reactor 10 and the first resonance condenser 8, and its anode is connected to the other end (negative terminal 1*b*) of the direct current power source 1, respectively. One end of the output reactor 4 is connected to the connection point of the second main terminal 2*b* of the switching device 2 and the cathode of the third rectifying device 11. The output condenser 5 is connected to the other end of the output reactor 4 and also to the other end (negative terminal 1*b*) of the direct current power source 1. The load 6 is connected with the output condenser 5, in parallel to each other. The control circuit 7 performs the open and close control of the switching device 2. Thereby, the power supply unit 100 supplies, to the load 6, the direct current power output, the voltage of which is lower than that of the direct current power source 1.

One end of the resonance reactor 10 is connected to the connection point of the second main terminal 2*b* of the switching device 2, one end of the output reactor 4 and the cathode of the third rectifying device 11. Further, the other end of the resonance reactor 10 is connected to the connection point of the other end of the first resonance condenser 8 and the cathode of the output rectifying device 3. One end (cathode) of the third rectifying device 11 is connected to the connection point of the switching device 2 and the resonance reactor 10. The first rectifying device 12 is connected to one end of the first resonance reactor 8 and also to the other end (negative terminal 1*b*) of the direct current power source 1. The other end of the first resonance condenser 8 is connected to the connection point of the resonance reactor 10 and the cathode of the output rectifying device 3. The second resonance condenser 14 is connected to the other end (anode) of the third rectifying device 11 and also to one end (positive terminal 1*a*) of the direct current power source 1. As for the second rectifying device 16, its cathode is connected to the other end (anode) of the third rectifying device 11, and its anode is connected to one end of the resonance reactor 8, respectively.

The control circuit 7 performs sensing of an electrical potential difference which is generated between both ends of the load 6. The control circuit 7 carries out calculations based on the sensed electric potential difference and produces a gate signal to the switching device 2 at a selected on duty. Moreover, the control circuit 7 performs sensing at arbitrary assigned points of the power supply unit 100, in order to execute sensing of the voltage of the direct current power source 1, the voltage of the load 6 and the current of the output reactor 4 and the like. It is available for the control circuit 7 to carry out calculations based on those sensed inputs and send a gate signal at a selected on duty to the switching device 2. The power supply unit 100 is capable of supplying a constant voltage to the load 6, by allowing the control circuit 7 to send the gate signal to the control terminal 2*c* of the switching device 2 at a selected on duty.

Figure 2:
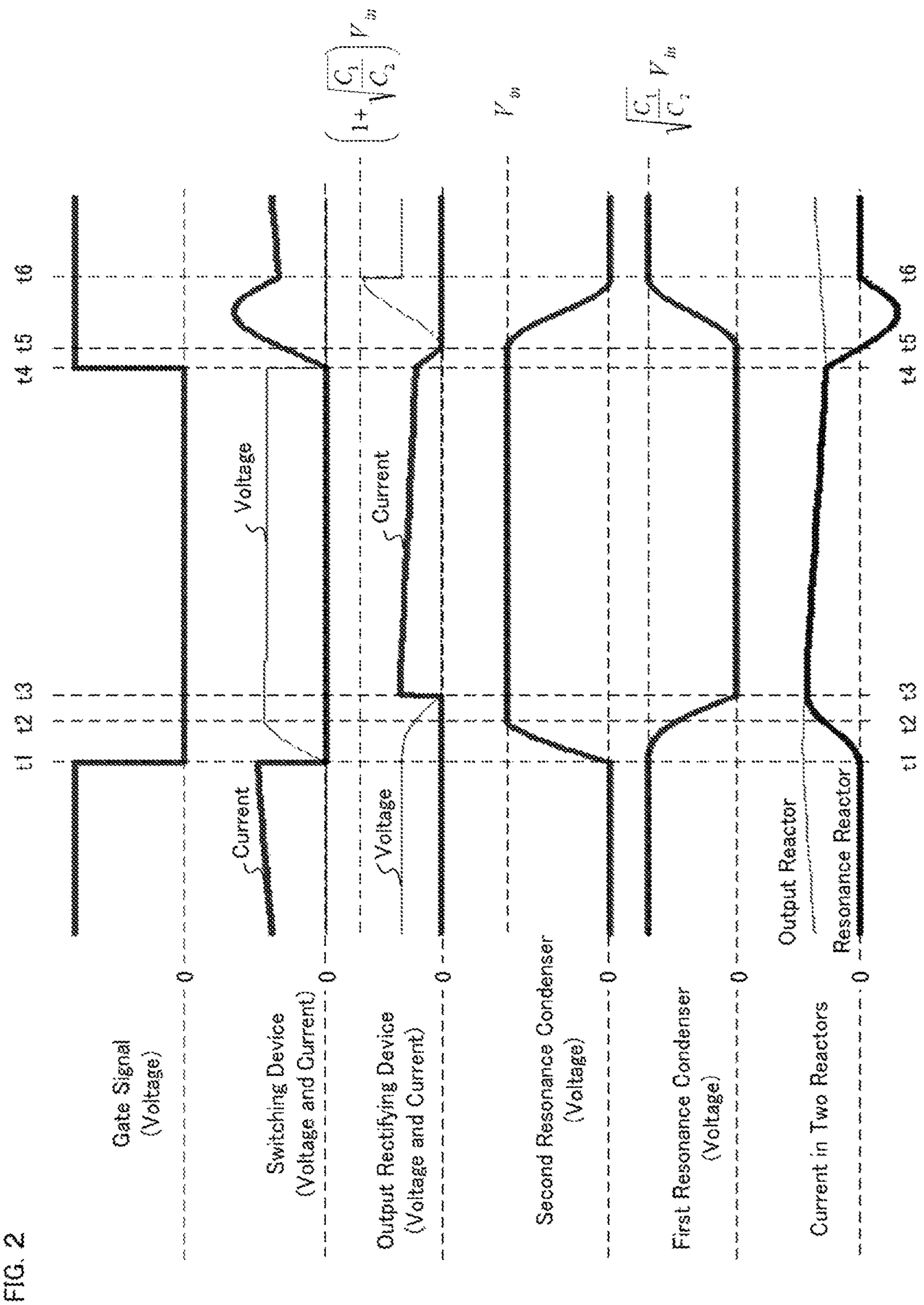
FIG. 2 is a diagram for showing the switching waveforms of the power supply unit in accordance with Embodiments 1 and 2 of the present invention.

Next, in reference to the switching waveforms shown in FIG. 2, explanation is made about the behavior of the power supply unit 100. The gate signal, which the control circuit 7 sends to the switching device 2, decays at time t1 and rises at time t4. The switching device 2 is switched from the on-state to the off-state at the timing of time t1. When the switching device 2 is on an off-state, the first resonance condenser 8 is discharged and, in addition, the second resonance condenser 14 is charged. When the switching device 2 is on an on-state, the second resonance condenser 14 is discharged. In addition, the first resonance condenser 8, the second resonance condenser 14 and the resonance reactor 10 enter into the resonance state, and thereby, the resonant current flows through the switching device 2. The electric current takes the following two paths during the period from the time t1 through until the time t2.

Current Path 1 (Direct Current Power Source 1)→(Second Resonance Condenser 14)→(Third Rectifying Device 11)→(Output Reactor 4)→(Output Condenser 5 or Load 6)→(Direct Current Power Source 1)

Current Path 2: (First Resonance Condenser 8)→(Resonance Reactor 10)—(Output Reactor 4)→(Output Condenser 5 or Load 6)→(First Rectifying Device 12)→(First Resonance Condenser 8)

In the switching device 2, as shown in the graph of voltage, ZVS (Zero Voltage Switching) is established at the time t1. During this period, the second resonance condenser 14 is in charge to a voltage Vin and the first resonance condenser 8 is in discharge. The second resonance condenser 14 acquires the voltage Vin at the timing of time t2 and a change in the current path takes place. Electric current takes the following two paths during the period from the time t2 through until the time t3. Note that, the ZVS denotes a state in which a steep leading edge of the voltage by hard switching method is limited to follow a softened manner.

Current Path 2: (First Resonance Condenser 8)→(Resonance Reactor 10)→(Output Reactor 4)→(Output Condenser 5 or Load 6)→(First Rectifying Device 12)→(First Resonance Condenser 8)

Current Path 3: (First Rectifying Device 12)→(Second Rectifying Device 16)→(Third Rectifying Device 11)→(Output Reactor 4)→(Output Condenser 5 or Load 6)→(First Rectifying Device 12)

The first resonance condenser 8 is discharged during the period from the time t2 through until the time t3. The voltage of the first resonance condenser 8 reaches 0V at the timing of the time t3 and a change in the current path occurs. Electric current takes the following path during the period from the time t3 through until the time t4. In the output rectifying device 3, as shown in the graph of voltage, the ZVS is established at the time t3.

Current Path 4: (Output Rectifying Device 3)→(Resonance Reactor 10) →(Output Reactor 4)→(Output Condenser 5 or Load 6)→(Output Rectifying Device 3)

The switching device 2 is switched from the off-state to the on-state at the timing of the time t4. Electric current takes the following two paths during the period from the time t4 through until the time t5. In the switching device 2, as shown in the graph of current, ZCS (Zero Current Switching) is established at the time t4. Note that, the ZCS denotes a state in which a steep leading edge of the current by the hard switching method is limited to follow a softened manner.

Current Path 5: (Direct Current Power Source 1)→(Switching Device 2)→(Output Reactor 4)→(Output Condenser 5 or Load 6)→(Direct Current Power Source 1)

Current Path 4: (Output Rectifying Device 3)→(Resonance Reactor 10)→(Output Reactor 4)→(Output Condenser 5 or Load 6)→(Output Rectifying Device 3)

A change in the current path takes place when the electric current, which flows through the switching device 2, becomes 0 A. Electric current takes the following two current paths during the period from the time t4 through until the time t6.

Current Path 5: (Direct Current Power Source 1)→(Switching Device 2)→(Output Reactor 4)→(Output Condenser 5 or Load 6)→(Direct Current Power Source 1)

Current Path 6: (Second Resonance Condenser 14)→(Switching Device 2)→(Resonance Reactor 10)→(First Resonance Condenser 8)→(Second Rectifying Device 16)→(Second Resonance Condenser 14)

In the output rectifying device 3, as shown in the graph of current and in the graph of voltage, the ZVS and the ZCS are established at the time t5. During this period, the resonant current flows through the Current Path 6. The second resonance condenser 14 is in discharge and the first resonance condenser 8 is in charge. Here, an assumption is made that the capacitance of the second resonance condenser 14 is C1 and the capacitance of the first resonance condenser 8 is C2. The output voltage of the first resonance condenser 8 is expressed as $\sqrt{(C1/C2)}\times Vin$. At the time t6, the voltage of the output rectifying device 3 becomes $(1+\sqrt{(C1/C2)})\times Vin$.

In order to reduce the withstanding voltage of the output rectifying device 3, it is probable to employ a method in that the capacitance of the first resonance condenser 8 (C2) is made larger than the capacitance of the second resonance condenser 14 (C1). A change in the current path takes place when the voltage of the second resonance condenser 14 becomes 0V. Electric current takes the following current path during the period from the time t6 through until the time t1.

Current Path 5: (Direct Current Power Source 1)→(Switching Device 2)→(Output Reactor 4)→(Output Condenser 5 or Load 6)→(Direct Current Power Source 1)

The resonance reactor 10 is connected to the connection point of the switching device 2 and the output reactor 4, and also to the cathode of the output rectifying device 3. One end (cathode) of the third rectifying device 11 is connected to the connection point of the switching device 2 and the resonance reactor 10. As for the first rectifying device 12, its cathode is connected to one end of the first resonance condenser 8, and its anode is connected to the other end (negative terminal 1*b*) of the direct current power source 1, respectively. The other end of the first resonance condenser 8 is connected to the connection point of the resonance reactor 10 and the output rectifying device 3. The second resonance condenser 14 is connected to the other end (anode) of the third rectifying device 11 and to one end ( positive terminal 1*a*) of the direct current power source 1. As for the second rectifying device 16, its cathode is connected to the other end (anode) of the third rectifying device 11, and its anode is connected to one end of the first resonance condenser 8, respectively.

In the power supply unit in accordance with Embodiment 1, the first resonance condenser 8 is in discharge and, in addition, the second resonance condenser 14 is in charge, when the switching device 2 is on an off-state. When the switching device 2 is on an on-state, the second resonance condenser 14 is discharged. In addition, the first resonance condenser 8, the second resonance condenser 14 and the resonance reactor 10 enter into the resonant state and the resonant current flows through the switching device 2. In the way described above, the power supply unit 100 maintains the circuit features of the DC to DC converter of chopper type. The electric current, which flows from the second resonance condenser 14, flows into the resonance reactor 10, when the switching device 2 is switched to the on-state. In the power supply unit 100 in accordance with the present embodiment, the electric current which flows from the direct current power source 1 does not flow into the resonance reactor 10. Thereby, the peak current of the resonance reactor 10 is reduced and a compact reactor can be employed as the resonance reactor 10.

Furthermore, according to the present invention, it is possible to eliminate from the circuit the components of large scale and large weight, like a current limiting reactor and others. In addition, the number of components in the circuit is reduced and the switching loss and noises are lowered. A power supply unit of low switching losses and low noises is available at a compact size, light weight and low cost. Further, the output rectifying device 3 accepts a conventional rectifying diode which has a long reverse recovery time. Accordingly, it is not necessary to employ a first recovery diode (FRD), which is short in reverse recovery time. While the power supply unit according to the present embodiment maintains an advantageous effect that it excludes the limit in electric components for use, the resonance reactor 10 accepts only the resonant current by the first resonance condenser 8, the second resonance condenser 14 and the resonance reactor 10, when the switching device 2 is on an on-state. The electric current which flows from the direct current power source 1 does not flow into the resonance reactor 10. Thereby, a compact reactor is suitable for the resonance reactor 10.

Embodiment 2.

Figure 3:
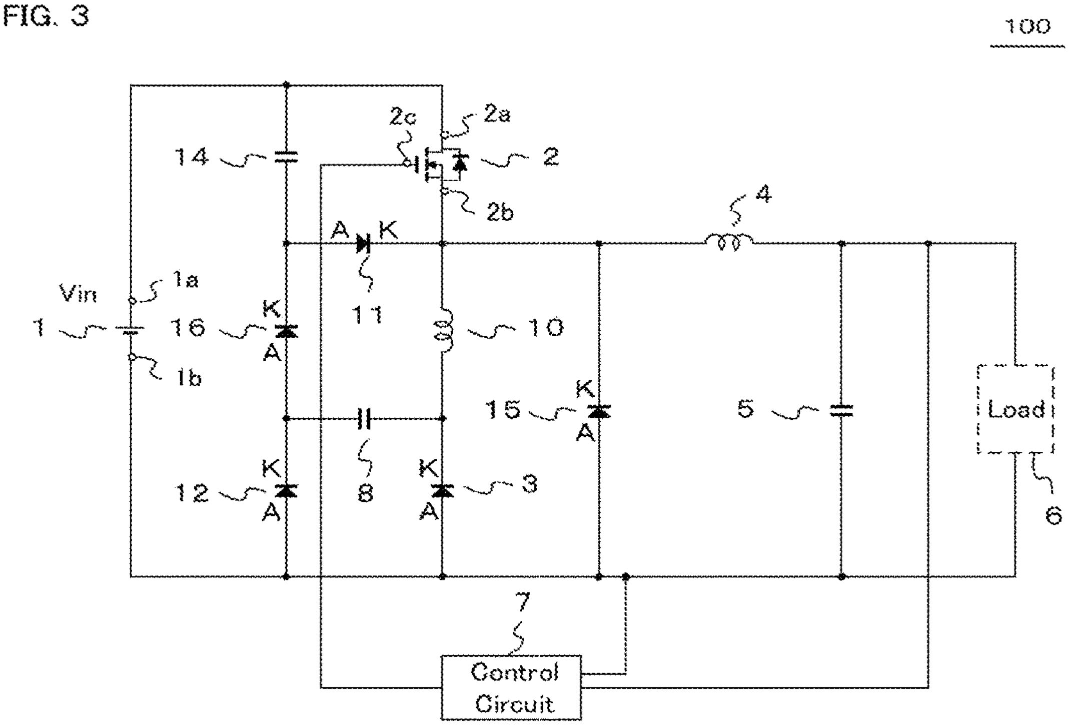
FIG. 3 is a circuit diagram for showing the power supply unit in accordance with Embodiment 2 of the present invention.

The circuit diagram about which explanation is made in Embodiment 2 is shown in FIG. 3. One end of the resonance reactor 10 is connected to the second main terminal 2*b* of the switching device 2, one end of the output reactor 4 and the cathode of the third rectifying device 11. As for the first rectifying device 12, its cathode is connected to one end of the first resonance condenser 8, and its anode is connected to the other end (negative terminal 1*b*) of the direct current power source 1, respectively. The other end of the resonance reactor 10 is connected to the other end of the first resonance condenser 8 and also to the cathode of the output rectifying device 3. The third rectifying device 11 has one end (cathode) which is connected to the connection point of the switching device 2 and the resonance reactor 10. The other end of the first resonance condenser 8 is connected to the connection point of the resonance reactor 10 and the output rectifying device 3. The second resonance condenser 14 is connected to the other end (anode) of the third rectifying device 11 and also to one end (positive terminal 1*a*) of the direct current power source 1.

As for the second rectifying device 16, its cathode is connected to the other end (anode) of the third rectifying device 11, and its anode is connected to one end of the first resonance condenser 8, respectively. As for the fourth rectifying device 15, its anode is connected to one end (negative terminal 1*b*) of the direct current power source 1, and its cathode is connected to the cathode of the third rectifying device 11, respectively. Accordingly, the electric current according to Embodiment 2 takes the following Current Path 3A, instead of the Current Path 3 of Embodiment 1.

Current Path 3A: (Fourth Rectifying Device 15)→(Output Reactor 4) →(Output Condenser 5 or Load 6)→(Forth Rectifying Device 15)

The basic behavior of the circuit according to Embodiment 2 is the same as that of Embodiment 1. The circuit according to Embodiment 2 differs from that of Embodiment 1 in that the fourth rectifying device 15 is connected with the series circuit, in parallel to each other, which is composed of the resonance reactor 10 and the output rectifying device 3. According to the power supply unit of the present embodiment, the number of rectifying devices taking the Current Path 3A is less than that of the Embodiment 1 (Current Path 3), because the fourth rectifying device 15 is employed in the circuit. Thereby, the power supply unit according to Embodiment 2 has the effects of Embodiment 1, and moreover, the switching loss is further lowered. Note that, the output reactor 4 is arranged in the positive side of the load 6 in Embodiment 2. Similar effects are produced in the power supply unit, even when the output reactor 4 is arranged in the negative side of the load 6.

Embodiment 3.

Figure 4:
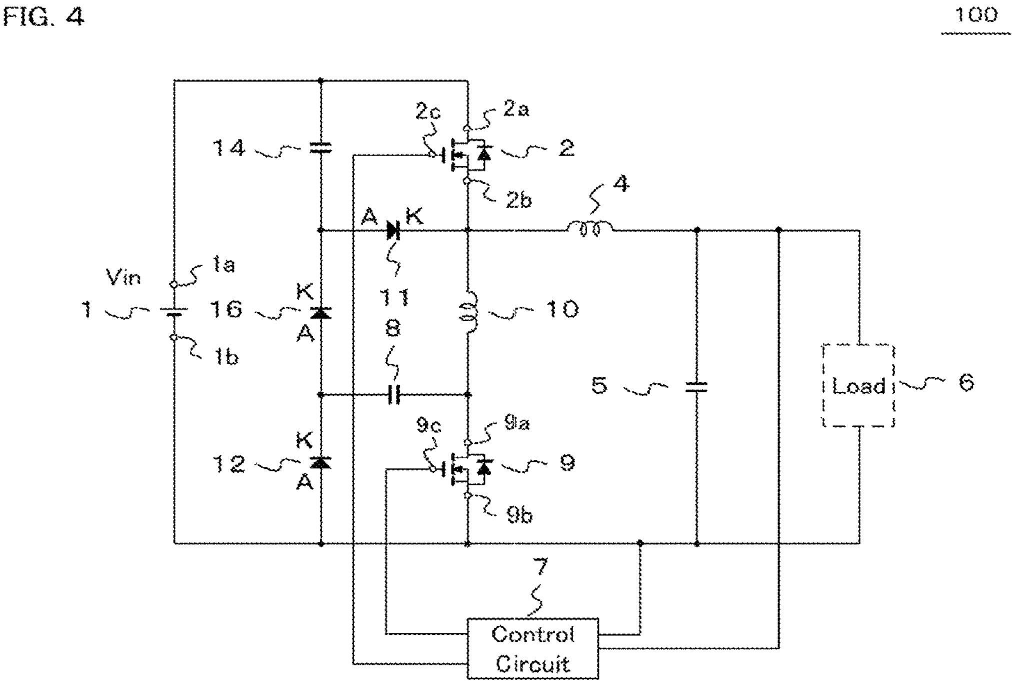
FIG. 4 is a circuit diagram for showing the power supply unit in accordance with Embodiment 3 of the present invention.

The circuit diagram about which explanation is made in Embodiment 3 is shown in FIG. 4. The basic behavior of the circuit according to Embodiment 3 is the same as that of Embodiment 1. The circuit according to Embodiment 3 differs from that of Embodiment 1 in that the switching device 9 is employed, as a substitute for the output rectifying device 3. The switching device 9 has a first main terminal 9*a*, a second main terminal 9*b* and a control terminal 9*c*. One end of the first resonance condenser 8 is connected to the cathode of the first rectifying device 12. As for the switching device 9, its first main terminal 9*a* is connected to the other end of the first resonance condenser 8 and its second main terminal 9*b* is connected to one end (negative terminal 1*b*) of the direct current power source 1, respectively. Accordingly, electric current takes the following Current Path 4A, instead of the Current Path 4 of Embodiment 1. Graphs of voltage and current pertinent to the switching device 9 are the same with the graphs of voltage and current pertinent to the output rectifying device 3 shown in FIG. 2. Note that, the output reactor 4 is arranged in the positive side of the load 6 in Embodiment 3. Similar effects are produced in the power supply unit, even when the output reactor 4 is arranged in the negative side of the load 6.

Current Path 4A: (Switching Device 9)→(Resonance Reactor 10)→(Output Reactor 4)→(Output Condenser 5 or Load 6)→(Switching Device 9)

Figure 5:
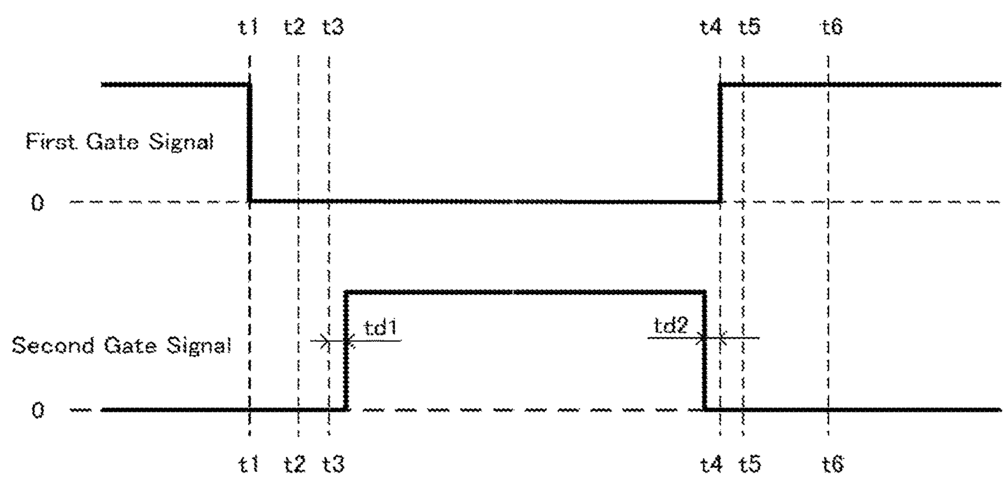
FIG. 5 is a diagram for showing the input waveforms of the gate signals in accordance with Embodiments 3 and 4 of the present invention.

FIG. 5 shows the switching waveforms of the gate signals, which are send to the switching device 2 (first switching device) and also to the switching device 9 (second switching device). A control circuit 7 transmits a first gate signal to the control terminal 2*c* of the switching device 2. Likewise, the control circuit 7 transmits a second gate signal to the control terminal 9*c* of the switching device 9. The first gate signal and the second gate signal are in a complementary relation. The switching device 9 is turned on, at the timing when the first resonance condenser 8 is discharged all together and the current starts to flow into the switching device 9. However, note that a dead time td1 is required. The switching device 9 is turned off, at the timing when the switching device 2 is turned on. However, note that a dead time td2 is required. The control circuit 7 makes the switching device 9 turn into an on-state, during which the electric current flows through the Current Path 4A. As a result, synchronous rectification is achieved. Accordingly, the power supply unit according to Embodiment 3 has the effects of Embodiment 1, and moreover, the switching loss is further lowered than the case where the rectifying device is employed.

Embodiment 4.

Figure 6:
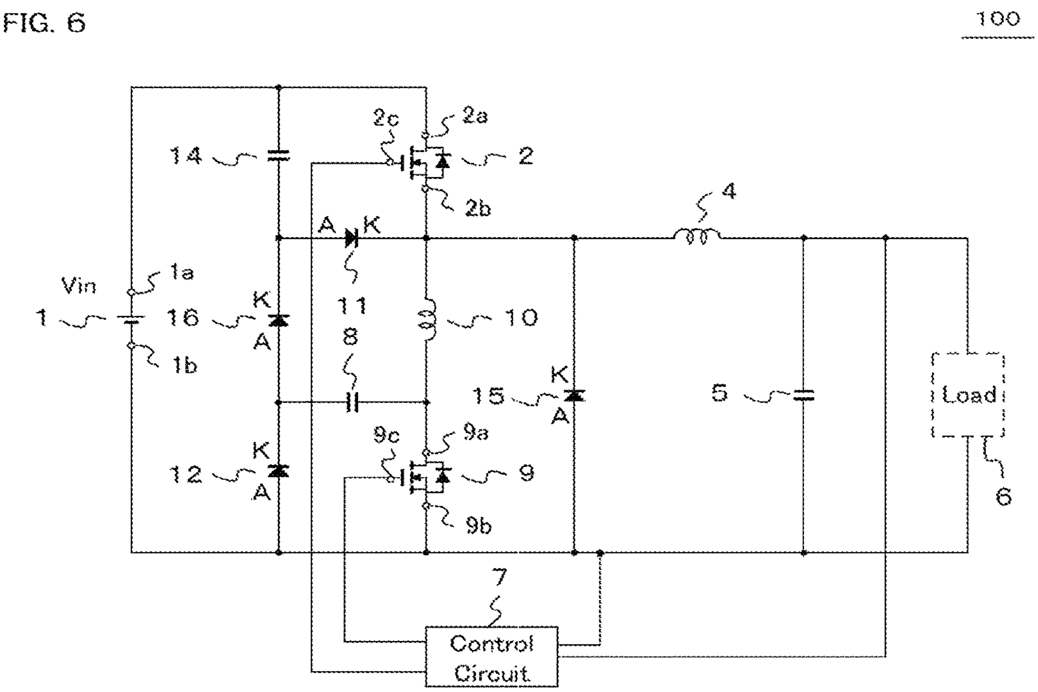
FIG. 6 is a circuit diagram for showing the power supply unit in accordance with Embodiment 4 of the present invention.

The circuit diagram about which explanation is made in Embodiment 4 is shown in FIG. 6. The circuit in accordance with Embodiment 4 is a circuit where the fourth rectifying device 15 shown in Embodiment 2 and the switching device 9 shown in Embodiment 3 are both applied. The first gate signal is sent to the control terminal 2*c* of the switching device 2 (see FIG. 5, for reference). Likewise, the second gate signal is sent to the control terminal 9*c* of the switching device 9 (see FIG. 5, for reference). As for the fourth rectifying device 15, its anode is connected to one end (negative terminal 1*b*) of the direct current power source 1 and its cathode is connected to the cathode of the third rectifying device 11, respectively. Accordingly, the power supply unit according to Embodiment 4 has both effects of Embodiment 2 and Embodiment 3. Note that, the output reactor 4 is arranged in the positive side of the load 6 in Embodiment 4. Similar effects are produced in the power supply unit, even when the output reactor 4 is arranged in the negative side of the load 6.

Embodiment 5.

Figure 7:
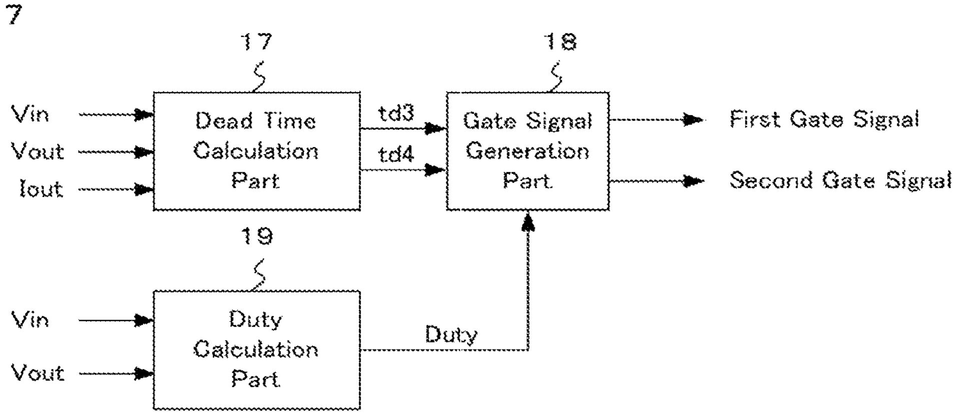
FIG. 7 is a diagram for showing the method of generating gate signals in accordance with Embodiment 5 of the present invention.

The circuit diagram of the power supply unit in accordance with Embodiment 5 is basically the same with the circuit diagram (see FIG. 4, for reference) in accordance with Embodiment 3. FIG. 7 shows the configuration of a control circuit 7, which is utilized in the present embodiment. The control circuit 7 generates a first gate signal which is sent to the switching device 2 (first switching device) and a second gate signal which is sent to the switching device 9 (second switching device). The control circuit 7 includes a dead time calculation part 17, a gate signal generation part 18 and a duty calculation part 19. The control circuit according to the present embodiment differs from that of Embodiment 3 in that the control circuit 7 holds the dead time calculation part 17 which calculates a dead time td3 (first dead time) and a dead time td4 (second dead time).

Figure 8:
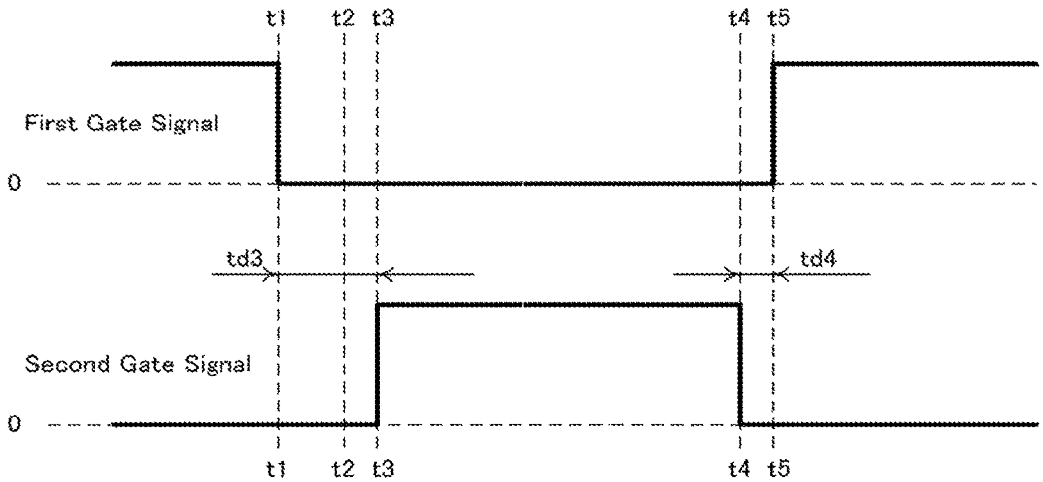
FIG. 8 is a diagram for showing the input waveforms of the gate signals in accordance with Embodiment 5 of the present invention.

FIG. 8 shows the switching waveforms of a first gate signal which is sent to the switching device 2 and a second gate signal which is sent to the switching device 9. Dead time is defined as a period when a first switching device (switching device 2) and a second switching device (switching device 9) are both on the off-state. The dead time dt3 needs to be provided between the time t1 (decay time of the first gate signal) and the time t3 (rise time of the second gate signal). The dead time dt4 needs to be provided between the time t4 (decay time of the second gate signal) and the time t5 (rise time of the first gate signal). The dead time td3 and the dead time td4 maintain minimal periods for escaping from the simultaneous turn-ons of the switching device 2 and the switching device 9. When the switching device 2 and the switching device 9 are turned on at the same time, the direct current power source 1 turns into a short circuit condition.

The dead time td3 is set to satisfy the conditions that the second resonance condenser 14 is charged to have the voltage of the direct current power source 1, the first resonance condenser 8 is discharged to have a 0V and, furthermore, the switching device 9 is turned on at the timing in which electric current starts to flow into the switching device 9. The length of the dead time td3 needs to be changed, taking into account the voltage of the direct current power source 1, the potential difference generated between the terminals of the load 6 and the current of the output reactor 4. The dead time calculation part 17 takes in, as its input, the voltage (Vin) of the direct current power source 1, the potential difference (Vout) generated between the terminals of the load 6 and the load current (Tout), and determines the dead time td3. The duty calculation part 19 takes in, as its input, the voltage (Vin) of the direct current power source 1 and the potential difference (Vout) generated between the terminals of the load 6, and determines the duty of the rectifying device 2. The dead time td3 and the dead time td4 tend to be shorter, as the electric current which flows through the output reactor 4 becomes larger, and the voltage generated between both ends of the load 6 (or the output condenser 5) becomes smaller or the voltage of the direct current power source 1 becomes smaller.

The gate signal generation part 18 takes in the dead time td3, the dead time td4 and the duty of the switching device 2 as its input, and generates a first gate signal and a second gate signal, as its output. The control circuit 7 calculates a best suited dead time td3 in no time and determines a gate signal, even in a case where any one of or all of the voltage of the direct current power source 1, the potential difference generated between the load 6 and the current of the output reactor 4 suffers large fluctuations. The body diode of the switching element 9 is made to have no duration at which the body diode is on a conductive state. Accordingly, effects on reducing the switching loss are further enhanced due to the synchronous rectification, in a case where a body diode, which has a larger on time resistance compared with the on resistance of the switching device 9, is employed as the device in the switching device 9.

Embodiment 6.

Figure 9:
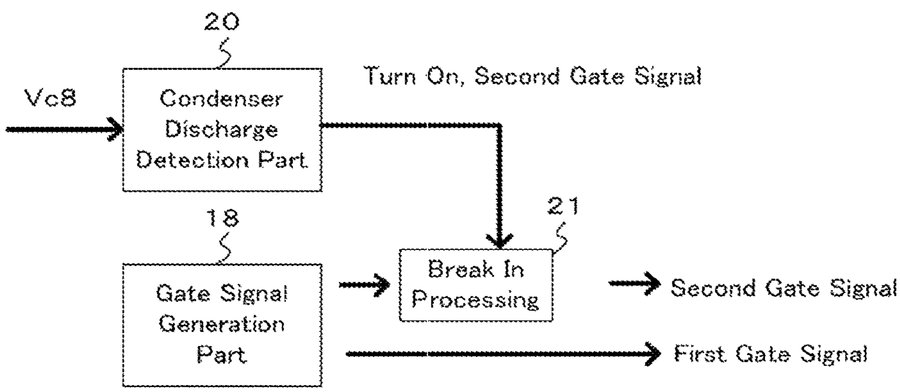
FIG. 9 is a diagram for showing the method of generating gate signals in accordance with Embodiment 6 of the present invention.

The circuit diagram of the power supply unit in accordance with Embodiment 6 is basically the same with the circuit diagram (see FIG. 4, for reference) in accordance with Embodiment 5. The configuration of a control circuit 7, which is utilized in the present embodiment, is shown in FIG. 9. The control circuit 7 includes a condenser discharge detection part 20, a gate signal generation part 18 and a break in processing 21. The control circuit 7 according to the present embodiment is different from the circuit in Embodiment 5 in that a dead time calculation part is not included in the circuit. The control circuit 7 according to the present embodiment detects the voltage of the first resonance condenser 8 and determines the timing for making the second switching device turn on. For example, the condenser discharge detection part 20 detects a timing when the detection voltage (Vc8) of the first resonance condenser 8 is changed from a plus quantity to 0V, and the break in processing 21 interposes the second gate signal with an on-instruction. At this time, each of the first gate signal which is sent to the first switching device and the second gate signal which is sent to the second switching device is limited to have a dead time larger than the minimal dead time to prevent the electrical short circuiting. Like in Embodiment 5, the body diode of the switching element 9 is thereby made to have no duration at which the body diode is on a conductive state. Accordingly, the effects on reducing the switching loss are furthest enhanced due to the synchronous rectification.

Embodiment 7.

Figure 10:
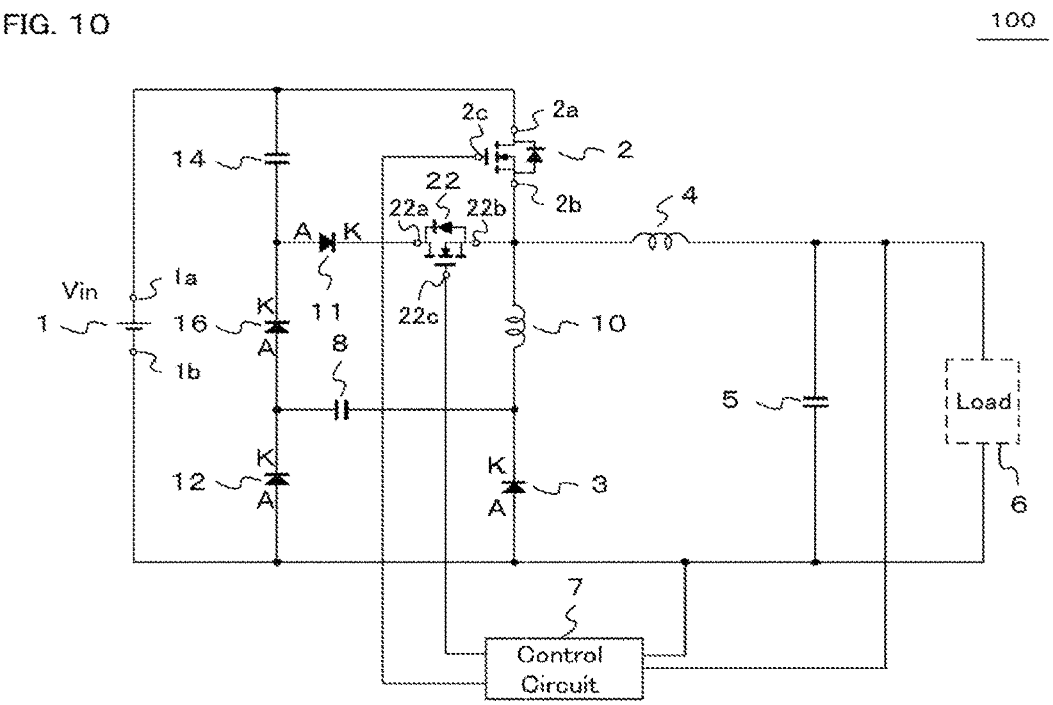
FIG. 10 is a circuit diagram for showing the power supply unit in accordance with Embodiment 7 of the present invention.

The circuit diagram of a power supply unit in accordance with Embodiment 7 is shown in FIG. 10. The power supply unit 100 in accordance with the present embodiment includes a direct current power source 1, a switching device 2, an output reactor 4, an output condenser 5, a control circuit 7, a resonance reactor 10, a first resonance condenser 8, a second resonance condenser 14, a first rectifying device 12, a second rectifying device 16, a third rectifying device 11 and an output rectifying device 3. The direct current power source 1 is configured to have a rectifying circuit which converts the alternative current voltage of an alternative current power source to the direct current voltage Vin), and has a positive terminal 1*a* and a negative terminal 1*b*.

The switching device (first switching device) 2 has a first main terminal 2a, a second main terminal 2*b* and a control terminal 2*c*. The switching device (second switching device) 22 has a first main terminal 22*a*, a second main terminal 22*b* and a control terminal 22*c*. The first rectifying device 12, the second rectifying device 16, the third rectifying device 11 and the output rectifying device 3, each and all, has an anode (A) and a cathode K). The output reactor 4 is arranged on the positive side of a load 6 here. However, same effects are produced in the power supply unit, even when the output reactor 4 is arranged on the negative side of the load 6. One main terminal (first main terminal 2*a*) of the first switching device 2 is connected to one end (positive terminal 1*a*) of the direct current power source 1.

Further, the other main terminal second main terminal 2*b*) of the switching device 2 is connected to one main terminal (second main terminal 22*b*) of the switching device 22. As for the output rectifying device 3, its cathode is connected to the connection point of the resonance reactor 10 and the first resonance condenser 8, and its anode is connected the other end (negative terminal 1*b*) of the direct current power source 1, respectively. One end of the output reactor 4 is connected to the connection point of the second main terminal 2*b* of the switching device 2 and the second main terminal 22*b* of the switching device 22. The output condenser 5 is connected the other end of the output reactor 4 and the other end (negative terminal 1*b*) of the direct current power source 1. The load 6 is connected with the output condenser 5, in parallel to each other.

The control circuit 7 makes the open and close control of the switching device 2, and thereby, the power supply unit 100 supplies the direct current power output, which has a lower voltage than the voltage of the direct current power source 1, to the load 6. One end of the resonance reactor 10 is connected to the connection point of the second main terminal 2*b* of the switching device 2, one end of the output reactor 4 and the second main terminal 22*b* of the switching device 22. The other end of the resonance reactor 10 is connected to the connection point of the other end of the first resonance condenser 8 and the cathode of the output rectifying device 3. The cathode of the third rectifying device 11 is connected to the other main terminal (first main terminal 22*a*) of the switching device 22.

The cathode the first rectifying device 12 is connected to one end of the first resonance condenser 8, and the anode of the device is connected to the other end (negative terminal 1*b*) of the direct current power source 1. The other end of the first resonance condenser 8 is connected to the connection point of the resonance reactor 10 and the cathode of the output rectifying device 3. The second resonance condenser 14 is connected to the other end (anode) of the third rectifying device 11 and also to one end (positive terminal 1*a*) of the direct current power source 1. As for the second rectifying device 16, its cathode and its anode are connected to the other end (anode) of the third rectifying device 11, and connected to one end of the first resonance condenser 8, respectively.

The control circuit 7 performs sensing of the electrical potential difference which is generated between both ends of the load 6. The control circuit 7 carries out calculations based on the sensed electrical potential difference and produces a first gate signal, which is sent to the switching device 2, at a selected on duty. Further, the control circuit 7 performs sensing at arbitrary assigned points of the power supply unit 100, in order to execute the sensing of the voltage of the direct current power source 1, the electrical potential difference of the load 6 and the current of the output reactor 4 and the like. It is available for the control circuit 7 to carry out calculations based on those sensed signals and send a second gate signal at a selected on duty to the switching device 22. The switching device 22 receives the second gate signal from the control circuit 7. The second gate signal makes the switching device 22 on a steady on-state when the sensed current of the output reactor 4 is larger than a predetermined quantity in current, while the second gate signal makes the switching device 22 on a steady off-state when the sensed current of the output reactor 4 is less than the predetermined quantity in current.

The power supply unit performs the same circuit operations as those of the Embodiment 1, when the switching device 22 is on a steady on-state. However, the power supply unit does not have a current path which charges the second resonance condenser 14, when the switching device 22 is on a steady off-state. Accordingly, a resonant action, which circulates a current path (Second Resonance Condenser 14) (Switching Device 2)→(Resonance Reactor 1O)→(First Resonance Condenser 8)→(Second Rectifying Device 16)→(Second Resonance Condenser 14), does not occur. Though effects to reduce the switching loss are not produced, the loss at the time of resonant operations can be eliminated.

Therefore, it is advisable to compare a total loss at the time of the steady on-state and a total loss at the time of steady off-state and find a current value of the output reactor 4 where the magnitude relationship of the losses is reversed. A predetermined quantity in current, which changes from the steady on-state to the steady off-state of the switching device 22, is preferably set at the reversing current value of the output reactor 4. Thereby, the control circuit 7 sends, at a selected on duty, a first gate signal to the control terminal 2*c* of the switching device 2, and in addition, switches the on and off of sending a second gate signal, which is sent to the control terminal 22*c* of the switching device 22, in response to the current of the output reactor 4. Accordingly, the power supply unit 100 supplies a constant voltage to the load 6. Enhanced effects to reduce the switching loss are produced in the power supply unit, even in a case where the current of the output reactor 4 is lower than that of Embodiment 1.

The switching device 2 and the output rectifying device 3, through which the electric current of the output reactor flows, need to be arranged on an assembling location with a sufficient separation, when the output reactor 4 is large in rating current. The resonance reactor 10 is allowed to keep an enough space for the arrangement. Further, the resonance reactor 10 may be substituted with a parasitic inductance component of an elongated wiring. Thereby, the thermal interference of the heat generated by the switching device 2 and the output rectifying device 3 can be prevented. In addition, using a wiring inductance leads to the reduction in the number of components.

Note that, according to the present invention, the embodiments may be freely combined or the embodiments may be appropriately modified or omitted within the scope of the invention.

EXPLANATION OF NUMERALS AND SYMBOLS

1 direct current power source; 1*a* positive terminal; 1*b* negative terminal; switching device; 2*a* first main terminal; 2*b* second main terminal; 2*c* control terminal; 3 output rectifying device; 4 output reactor; 5 output condenser 6 load; 7 control circuit; 8 first resonance condenser; 9 switching device; 9*a* first main terminal; 9*b* second main terminal; 9*c* control terminal; 10 resonance reactor; 11 third rectifying device; 12 first rectifying device; 14 second resonance condenser; 15 forth rectifying device; 16 second rectifying device; 17 dead time calculation part; 18 gate signal generation part; 19 duty calculation part; 20 condenser discharge detection part; 21 break in processing; 22 switching device; 100 power supply unit

What is claimed is:

1. A circuit of a power supply unit, comprising:

a first rectifying device having an anode which is to be connected to a negative terminal of a direct current power source, a second rectifying device having an anode which is connected to a cathode of the first rectifying device, a first condenser having one end which is connected to the anode of the second rectifying device, a second condenser connected to a cathode of the second rectifying device and connected to a positive terminal of the direct current power source, a third rectifying device having an anode which is connected to the cathode of the second rectifying device, a resonance reactor connected to a cathode of the third rectifying device and connected to an other end of the first condenser, a switching device having a first main terminal which is to be connected to the positive terminal of the direct current power source, having a second main terminal which is connected to the cathode of the third rectifying device, an output reactor having one end which is connected to the cathode of the third rectifying device, an output condenser including one end and an other end, the one end to be connected to the negative terminal of the direct current power source and the other end connected to the other end of the output reactor, an output rectifying device having a cathode which is connected to the other end of the first condenser and having an anode which is to be connected to the negative terminal of the direct current power source, a control circuit, executing sensing of at least one of a voltage of the direct current power source, a voltage of a load, and a current of the output reactor, carrying out calculations based on the sensed input(s), and sending a gate signal to a control terminal of the switching device at a selected on duty, and a fourth rectifying device having an anode which is to be connected to the negative terminal of the direct current power source and having a cathode which is connected to the cathode of the third rectifying device and the output reactor, the fourth rectifying device connected in parallel with a series of the output rectifying device and the resonance reactor.

2. The circuit of a power supply unit as set forth in claim 1, wherein the resonance reactor is made of a wiring with a parasitic inductance.

3. A circuit of a power supply unit, comprising:

a first rectifying device having an anode which is to be connected to a negative terminal of a direct current power source, a second rectifying device having an anode which is connected to a cathode of the first rectifying device, a first condenser having one end which is connected to the anode of the second rectifying device, a second condenser connected to a cathode of the second rectifying device and to be connected to a positive terminal of the direct current power source, a third rectifying device having an anode which is connected to the cathode of the second rectifying device, a resonance reactor connected to a cathode of the third rectifying device and connected to an other end of the first condenser, a first switching device having a first main terminal which is to be connected to the positive terminal of the direct current power source, having a second main terminal which is connected to a cathode of the third rectifying device, and having a control terminal connected to a control circuit, an output reactor having one end which is connected to the cathode of the third rectifying device, an output condenser including one end and an other end, the one end to be connected to the negative terminal of the direct current power source and the other end connected to the other end of the output reactor, a second switching device having a first main terminal which is connected to the other end of the first condenser, and having a second main terminal which is to be connected to the negative terminal of the direct current power source, and a control circuit, executing sensing of at least one of a voltage of the direct current power source, a voltage of a load, and a current of the output reactor, carrying out calculations based on the sensed input(s), and sending a first gate signal to a control terminal of the first switching device and sending a second gate signal to a control terminal of the second switching device, the second gate signal being in an opposite phase to a phase of the first gate signal at a selected on duty, wherein a first dead time is set between a decay time of the first gate signal and a rise time of the second gate signal, and a second dead time is set between a decay time of the second gate signal and the rise time of the first gate signal, the length of the first dead time and the length of the second dead time become shorter as the current which flows through the output reactor becomes larger, the voltage at both ends of the output condenser becomes smaller and the voltage of the direct current power source becomes smaller, and the first dead time is set to satisfy the conditions that the second resonance condenser is charged to have the voltage of the direct current power source, the first resonance condenser is discharged to have a 0V and, furthermore, switching devices are turned on at the timing in which electric current starts to flow into the switching devices.

4. The circuit of a power supply unit as set forth in claim 3, wherein the second gate signal is turned on at the timing when the detected voltage of the first condenser is decayed.

5. The circuit of a power supply unit as set forth in claim 3, wherein the resonance reactor is made of a wiring with a parasitic inductance.

6. A circuit of a power supply unit, comprising:

a first rectifying device having an anode which is to be connected to a negative terminal of a direct current power source, a second rectifying device having an anode which is connected to a cathode of the first rectifying device, a first condenser having one end which is connected to the anode of the second rectifying device, a second condenser connected to a cathode of the second rectifying device and to be connected to a positive terminal of the direct current power source, a third rectifying device having an anode which is connected to the cathode of the second rectifying device, a resonance reactor connected to a cathode of the third rectifying device and connected to an other end of the first condenser, a first switching device having a first main terminal which is to be connected to the positive terminal of the direct current power source, and having a second main terminal which is connected to a cathode of the third rectifying device, an output reactor having one end which is connected to the cathode of the third rectifying device, an output condenser including one end and an other end, the one end to be connected to the negative terminal of the direct current power source and the other end connected to the other end of the output reactor, a second switching device having a first main terminal which is connected to the other end of the first condenser, and having a second main terminal which is to be connected to the negative terminal of the direct current power source, a control circuit, executing sensing of at least one of a voltage of the direct current power source, a voltage of a load, and a current of the output reactor, carrying out calculations based on the sensed input(s), and sending a first gate signal to a control terminal of the first switching device and sending a second gate signal to a control terminal of the second switching device, the second gate signal being in an opposite phase to a phase of the first gate signal at a selected on duty, and a fourth rectifying device having an anode which is to be connected to the negative terminal of the direct current power source and having a cathode which is connected to the cathode of the third rectifying device and the output reactor, the fourth rectifying device connected in parallel with a series of the output rectifying device and the resonance reactor.

7. The circuit of a power supply unit as set forth in claim 6, wherein a first dead time is set between a decay time of the first gate signal and a rise time of the second gate signal, and a second dead time is set between a decay time of the second gate signal and the rise time of the first gate signal.

8. The circuit of a power supply unit as set forth in claim 7, wherein the length of the first dead time and the length of the second dead time become shorter as the current which flows through the output reactor becomes larger, the voltage at both ends of the output condenser becomes smaller and the voltage of the direct current power source becomes smaller, and the first dead time is set to satisfy the conditions that the second resonance condenser is charged to have the voltage of the direct current power source, the first resonance condenser is discharged to have a 0V and, furthermore, switching devices are turned on at the timing in which electric current starts to flow into the switching devices.

9. The circuit of a power supply unit as set forth in claim 6, wherein the second gate signal is turned on at the timing when the detected voltage of the first condenser is decayed.

10. A circuit of a power supply unit, comprising:

a first rectifying device having an anode which is to be connected to a negative terminal of a direct current power source, a second rectifying device having an anode which is connected to a cathode of the first rectifying device, a first condenser having one end which is connected to the anode of the second rectifying device, a second condenser connected to a cathode of the second rectifying device and to be connected to a positive terminal of the direct current power source, a third rectifying device having an anode which is connected to the cathode of the second rectifying device, a resonance reactor having one end connected to an other end of the first condenser, a first switching device having a first main terminal which is to be connected to the positive terminal of the direct current power source, and having a second main terminal which is connected to an other end of the resonance reactor, a second switching device having a first main terminal which is connected to a cathode of the third rectifying device, and having a second main terminal which is directly connected to a second main terminal of the first switching device, and the other end of the resonance reactor, an output rectifying device having a cathode which is connected to an other end of the first condenser and having an anode which is to be connected to the negative terminal of the direct current power source, an output reactor having one end which is directly connected to the second main terminal of the second switching device, an output condenser including one end and an other end, the one end to be connected to the negative terminal of the direct current power source and the other end connected to an other end of the output reactor, and a control circuit sending a first gate signal to a control terminal of the first switching device and sending a second gate signal to a control terminal of the second switching device, the second gate signal being in an opposite phase to a phase of the first gate signal.

11. The circuit of a power supply unit as set forth in claim 10, wherein the resonance reactor is made of a wiring with a parasitic inductance.

* * * * *